United States Patent

[11] 3,581,518

| [72] | Inventor | Marcel Simkens |
| | | Beernem, Belgium |
| [21] | Appl. No. | 773,077 |
| [22] | Filed | Nov. 4, 1968 |
| [45] | Patented | June 1, 1971 |
| [73] | Assignee | Friac, |
| | | Aalst, Belgium |
| [32] | Priority | Nov. 10, 1967 |
| [33] | | Belgium |
| [31] | | 706,314 |

[54] DEVICE FOR TEMPERATURE REGULATION INSIDE CLOSED SPACES PARTICULARLY DEEP-FREEZERS
5 Claims, 1 Drawing Fig.

[52] U.S. Cl............................................................ 62/209,
 62/213, 62/227
[51] Int. Cl...................................................... F25b 41/00

[50] Field of Search.................................... 62/203,
 208—213, 227

[56] References Cited
UNITED STATES PATENTS

| 2,101,498 | 12/1937 | Grooms | 62/209 |
| 2,146,797 | 2/1939 | Dasher | 62/208 |
| 2,213,505 | 9/1940 | Raney | 62/209 |

*Primary Examiner*—Meyer Perlin
*Attorney*—Steven, Davis, Miller & Mosher

ABSTRACT: A device for regulating the temperature inside a freezer which has a prefreezing compartment separated by a partition wall. Two thermostats connected in parallel are used, the detection for one being located in the storage compartment and the other in the prefreezing compartment on the partition wall where it is affected only by the temperature of the food introduced into the compartment.

PATENTED JUN 1 1971

3,581,518

INVENTORS
MARCEL SIMKENS

BY
*Stevens, Davis, Miller & Mosher*
ATTORNEYS

DEVICE FOR TEMPERATURE REGULATION INSIDE CLOSED SPACES PARTICULARLY DEEP-FREEZERS

This invention relates to a device for regulating the temperature inside closed spaces wherein the materials to be treated are located, particularly inside deep-freezers, with at least one first thermostat which is connected in the operating circuit of a source of heat or cooling which regulates the temperature inside said space, and with at least one detector of said thermostat arranged adjacent said source.

For the freezing of food products, this operation should be performed as rapidly as possible to secure as good a quality as possible of these products. The faster the products are frozen, the smaller the ice crystals which are formed and the less cell walls are destroyed, this resulting in a smaller loss of water also when unfreezing.

For this purpose, three known methods have been used up to now and to each one is attached a serious drawback.

The first method comprises adjusting the deep-freezer thermostat to as low as possible in cut-in temperature, in such a way that the compressor which drives the cooling medium through the coils of the deep-freezer, goes on working and thereby the highest freezing speed is obtained. This has however the drawback that by the return adjustment of the thermostat mistakes are possible, usually one simply forgets to return the thermostat to its previous setting, which results in an abnormally high current consumption. In this way it is also difficult to determine when everything has been frozen and the thermostat must be set back.

A second method comprises providing a switch which enables to short circuit the thermostat. The first-mentioned drawback is thus disposed of, but the two other drawbacks still remain.

A third method comprises a clock switch whereby the thermostat may be short circuited. Each scale mark of the clock switch corresponds to 1 kg. of the product to be frozen. If for instance 30 kg. of some product have to be frozen, the clock switch is then set to the 30-mark. In this way, all of the above-mentioned drawbacks are in principle avoided. There still remains however an additional drawback. It is always necessary to take into account the fact that the freezing time is not only dependent on the weight of the products to be frozen but also on the kind and mostly on the water content of these products. Further, the freezing power is heavily dependent on the room temperature, as the higher the room temperature is the lower the efficiency of the compressor will be, while the losses of the deep-freezer will be greater, whereby the efficiency of the freezing unit is greatly reduced.

A principle object of this invention is to obviate these various drawbacks by providing an automatic-working device which acts upon the source of heat or cooling upon the introduction of a material to be treated in such a way that the most favorable conditions are always offered therefor.

For this purpose, according to the present invention there is connected, in said operating circuit in parallel with a first thermostat, a second thermostat a detector of which is located in said space, which second thermostat is adjusted to a cut-in temperature which lies outside the limits of the working temperature of the first thermostat.

Ideally, the detector of the second thermostat in said space is most mounted in a location where the temperature is strongly influenced by the temperature of the materials introduced in this space.

In a preferred embodiment of the invention, for a deep-freezer, both thermostats are connected in parallel in the operating circuit of the compressor used to drive a cooling medium through coils of the cold source, whereby the detector of the first thermostat is mounted adjacent a cooling coil and the detector of the second thermostat lies in said space, which second thermostat is set to a cut-in temperature which is higher than the cut-in temperature of the first thermostat.

In an advantageous embodiment of the invention, the detector of the second thermostat is arranged in a prefreezing space of the deep-freezer, on an uncooled partition wall.

In a particular embodiment of the invention, the second thermostat is set approximately to a cut-in temperature of $-15°$ C.

Other details and features of the invention will be apparent from the description given below by way of nonlimitative example and with reference to the accompanying drawings, in which.

In both figures identical reference numerals pertain to similar elements.

Figure 1:
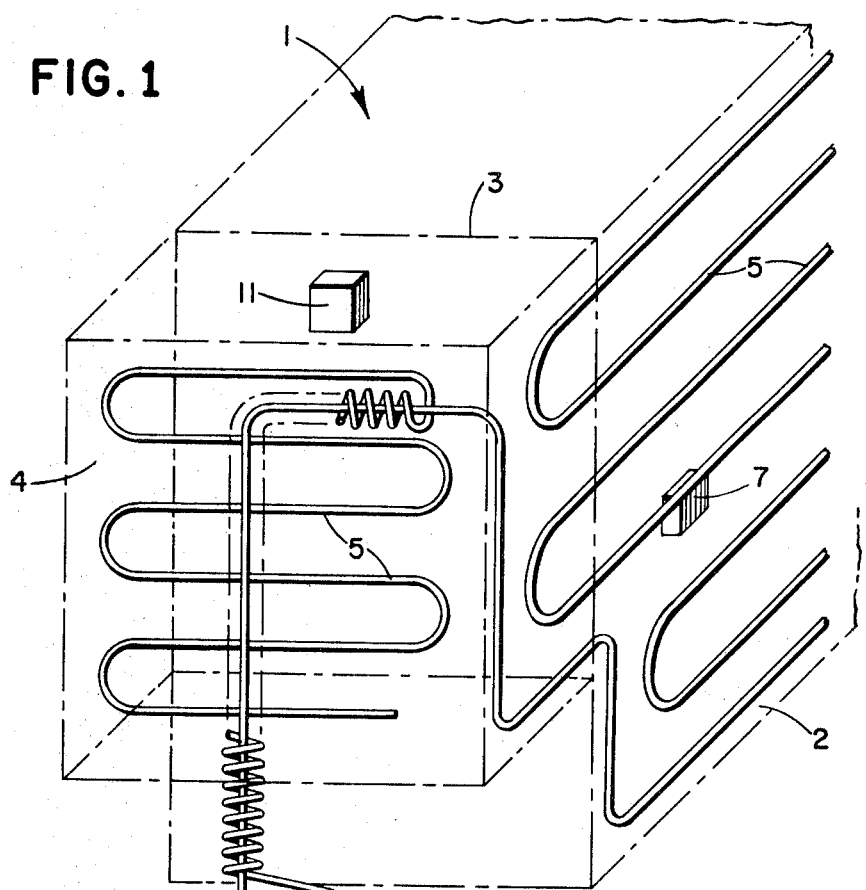
FIG. 1 is a diagrammatic perspective view of part of a deep-freezer provided with a device for regulating the temperature according to the invention.

The deep-freezer 1 shown in FIG. 1 is of known construction comprising an insulated chest 2 wherein an uncooled partition wall 3 is provided to section off a prefreezing space 4, wherein food products to be deep-frozen may be introduced before being stored in the other part (storage compartment) of chest 2. In the walls of the chest 2 are arranged cooling coils 5 which enable regulation of the temperature of the deep-freezer 1. These coils 5 are connected to a compressor 6 which is shown diagrammatically at 6.

Figure 2:
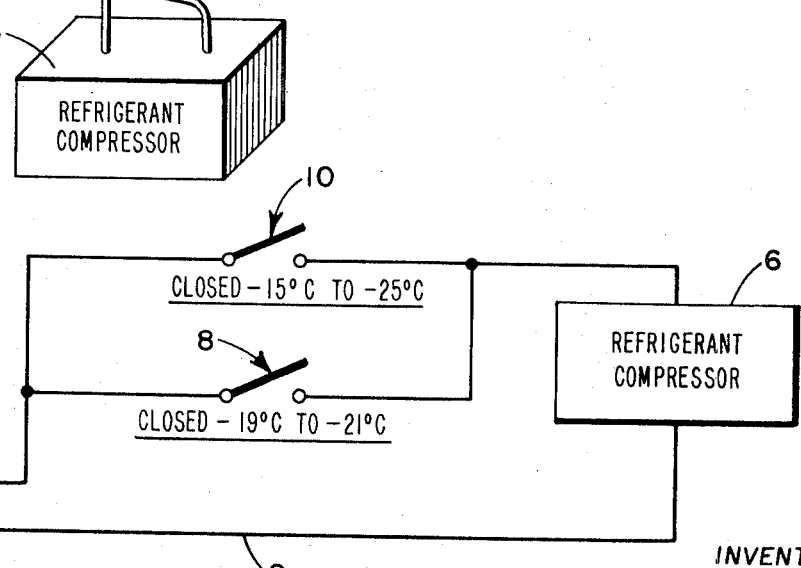
FIG. 2 is a diagram of the circuitry of a device according to the invention.

Against one of said cooling coils 5 is located a detector 7 of a first thermostat 8, which has a relatively large range differential. This thermostat 8 is connected in series in the electric operating circuit 9 of the compressor 6 (see FIG. 2), in such a way that whenever the thermostat is open, the operating circuit of the compressor 6 is cut out. The thermostat is so adjusted that it is cut-in or closed whenever its detector 7 reaches a temperature of $-19°$ C. and it is cut out when the detector temperature reaches $-25°$ C. The mean temperature in the deep-freezer 1 will thereby reach $-20°$ C. and it will be approximately $-19°$/C. by the cutting in and approximately $-21°$ C. by the cutting out of the thermostat 8. Indeed, due to the fact that the detector 7 lies on a cooling coil 5 wherein cold is produced, there is a substantial differential between the temperature in the center of the deep-freezer 1 and the temperature of the detector 7 of the thermostat 8 by the cutting out of the compressor 6.

According to the invention, a second thermostat 10 is connected in parallel with the first thermostat in said operating circuit 9. This thermostat 10 is provided with a detector 11 which, in the prefeezing space 4, is arranged on the uncooled partition wall 3 and it is preferably adjusted to a cut-in temperature of $-15°$ C., while the adjusted cutout temperature is $-25°$ C. Thus the cut-in temperatures of the first and second thermostats will have a differential of $4°$ C. The selection of the location of the detector 11 is determined experimentally by means of thermocouples. This location must be so chosen that by the introduction of a product to be deep-frozen in the prefreezing space 4, the temperature in the concerned location will be influenced as much as possible by the temperature of the product introduced. It has thus been determined that the introduction of 5 kg. of meat at the room temperature in the prefreezing space 4, a temperature rise of $8°$ C. is caused on the partition wall 3, so that this location fulfills the set condition. An additional condition which this location must meet, is that a temperature rise in this location may only be caused by the introduction of a product to be deep-frozen in this space 4 and that for instance the opening of the cover of the deep-freezer 1 may only have but a slight influence on the temperature at this location. Tests have shown that for a room temperature of $+21°$ C., the deep-freezer cover must remain open at least 5 minutes to cause a temperature raise of $2°$ C. on the detector 11 which is located against the partition wall 3. By these tests, the deep-freezer was normally filled and the prefreezing space 4 was empty.

The above-described device according to the invention works as follows.

When new products are introduced in the prefreezing space 4 of the deep-freezer 1, the temperature on the partition wall 3 is raised to above $-15°$ C. and the second thermostat 10 is thus cut in, which results in the compressor 6 being operated. The compressor 6 will go on working until the detector 11 of the thermostat reaches −25° C. It has been determined experimentally that the time interval between the freezing to the core of the products and the cutting out of the thermostat is very short and this is independent of the amount and the kind of the products.

It has for instance been determined during tests that:

2.5 kg. of cream cheese is frozen after 7 hours, the thermostat 10 cuts out after 8 hours and the temperature in the core is −9° C.

5.7 kg. of meat is frozen after 6 hours, the thermostat 10 cuts out after 7 hours and the temperature in the core is 4.5° C.

40 kg. of meat is frozen to the core after 38 hours and the thermostat 10 cuts out after 38 hours.

24 half small breads are frozen after 11 hours down to the core of the less favourable small bread and the thermostat 10 cuts out after 9.7 hours.

Once the thermostat 10 is cut out, thus after the freezing, its remains cut out as long as no more new products are introduced in the prefreezing space 4, due to the fact that the thermostat 8 is cut in as described above, on the moment when the temperature in the prefreezing space 4 rises above −19° C. When opening the cover of the deep-freezer 1, it is only the first thermostat 8 which is cut in.

When introducing very small amounts of products which are to be deep-frozen in the prefreezing space 4, the second thermostat 10 is actually not cut in. This is no drawback as, in this case, it is not worth putting the deep-freezer in operation. If this is however desired, it is possible to provide a pushbutton (not shown) which acts upon the differential mechanism of the thermostat 10 in such a way that it may be cut in. Thus this thermostat may be cut in manually when bringing in small amounts of products. It will then, as described above, automatically cut out after the freezing of these products.

Moreover, according to the invention, a mechanical connection (not shown) may be provided between both thermostats 8 and 10, which makes an easy adjustment of their cutting in and cutting out temperatures possible. If the means temperature of the deep-freezer 1 must be lowered, it is only necessary to act upon the thermostat 8.

The device for regulating the temperature inside closed spaces according to the invention thus operates completely automatically. The current saving is maximized. In case of failure of the normal thermostat 8, if the temperature rises above −15° C., the fast-freezing thermostat 10 will operate, which means an additional security against thawing.

The invention is not limited to the above embodiments and many changes may be brought therein without departing from the scope of the invention as defined by the appended claims.

For instance, a similar device for temperature regulation may be used in furnaces where a product to be treated must be brought in the shortest time possible to the desired elevated temperature.

I claim:

1. A device for regulating the temperature inside a deep-freezer having a prefreezing compartment and a storage compartment, wherein food products to be deep-frozen are initially introduced into said prefreezing compartment before being stored in said storage compartment, a partition wall separating said compartments, said device comprising two thermostats connected in parallel in the operating circuit of a cooling source, which regulates the temperature inside the deep-freezer, a detector cooperating with each thermostat, one of these detectors being arranged in the storage compartment, the other detector being arranged in the prefreezing compartment on said partition wall at a place in which the temperature is directly influenced by the temperature of the food products introduced in the prefreezing compartment, the thermostat being operated by the detector mounted in the prefreezing compartment being adjusted to a cut-in temperature which is higher than the cut-in temperature of the other thermostat, while the cutout temperatures of both thermostats are about the same.

2. Device as claimed in claim 1, in which the detector in the prefreezing compartment is mounted on said partition wall and said wall is not directly cooled.

3. Device as claimed in claim 1, in which the differential between the cutting-in temperatures of the thermostats is between 4° and 6° C.

4. Device as claimed in claim 1, in which the second thermostat is set approximately to a cut-in temperature of −15° C.

5. Device as claimed in claim 1, in which the second thermostat is set to a cutout temperature of approximately −25° C.